(12) United States Patent
Choe

(10) Patent No.: US 8,040,342 B2
(45) Date of Patent: Oct. 18, 2011

(54) IMAGE COMPENSATION APPARATUS AND METHOD

(75) Inventor: Won-hee Choe, Gyeongju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1094 days.

(21) Appl. No.: 11/770,835

(22) Filed: Jun. 29, 2007

(65) Prior Publication Data

US 2008/0122833 A1 May 29, 2008

(30) Foreign Application Priority Data

Jul. 4, 2006 (KR) .................. 10-2006-0062603

(51) Int. Cl.
*G06F 3/038* (2006.01)
*G09G 5/00* (2006.01)
(52) U.S. Cl. ..................... 345/214; 345/102
(58) Field of Classification Search .......... 345/102, 345/211–214

See application file for complete search history.

(56) References Cited

U.S. PATENT DOCUMENTS

| 6,300,931 B1 | 10/2001 | Someya et al. |
| 2002/0036716 A1 | 3/2002 | Ito et al. |
| 2005/0110740 A1 | 5/2005 | Linzmeier et al. |
| 2005/0122287 A1 | 6/2005 | Nishitani et al. |
| 2006/0071899 A1 | 4/2006 | Chang et al. |
| 2006/0146003 A1* | 7/2006 | Diefenbaugh et al. ........ 345/102 |
| 2006/0152586 A1* | 7/2006 | Komiya et al. .......... 348/207.99 |

FOREIGN PATENT DOCUMENTS

| JP | 11-65531 | 3/1999 |
| JP | 2002-366121 | 12/2002 |
| JP | 2004-54250 | 2/2004 |
| JP | 2004-102244 | 4/2004 |
| JP | 2005-106951 | 4/2005 |
| JP | 2005-130034 | 5/2005 |
| JP | 2006-106495 | 4/2006 |
| KR | 2004-54118 | 6/2004 |
| KR | 2005-23232 | 3/2005 |
| KR | 2005-87476 | 8/2005 |
| WO | 2005/052907 | 6/2005 |
| WO | 2006/060666 A2 | 6/2006 |
| WO | 2007/029420 | 3/2007 |

OTHER PUBLICATIONS

European Search Report dated Dec. 16, 2010 in corresponding European Patent Application 07793176.4.
International Search Report and Written Opinion issued in corresponding International Application No. PCT/KR2007/003218 dated Oct. 9, 2007.

(Continued)

*Primary Examiner* — Ricardo L Osorio
(74) *Attorney, Agent, or Firm* — Staas & Halsey LLP

(57) ABSTRACT

An image compensation apparatus and method is provided. The image compensation apparatus includes a power control module which controls a light emitting unit according to a power control input signal input thereto by a user and provides power reduction information corresponding to the power control input signal, a control parameter generation module which determines a threshold based on the power reduction information, an image compensation module which divides input image information according to the threshold and converts the input image information according to image control information, and an output module which outputs image information obtained by the conversion performed by the image compensation module.

10 Claims, 6 Drawing Sheets

OTHER PUBLICATIONS

Choe et al. "High Quality Image Processing for Mobile Displays," Samsung Journal of Innovative Technology. vol. 2, No. 1, Feb. 2006 pp. 119-130.

Chinese Office Action dated Aug. 3, 2010, issued in corresponding Chinese Patent Application No. 200780025306.0.
Japanese Office Action dated Aug. 9, 2011, issued in Japanese Patent Application No. 2009-517992.

* cited by examiner

GRAYSCALE LOSS OCCURRENCE AREA

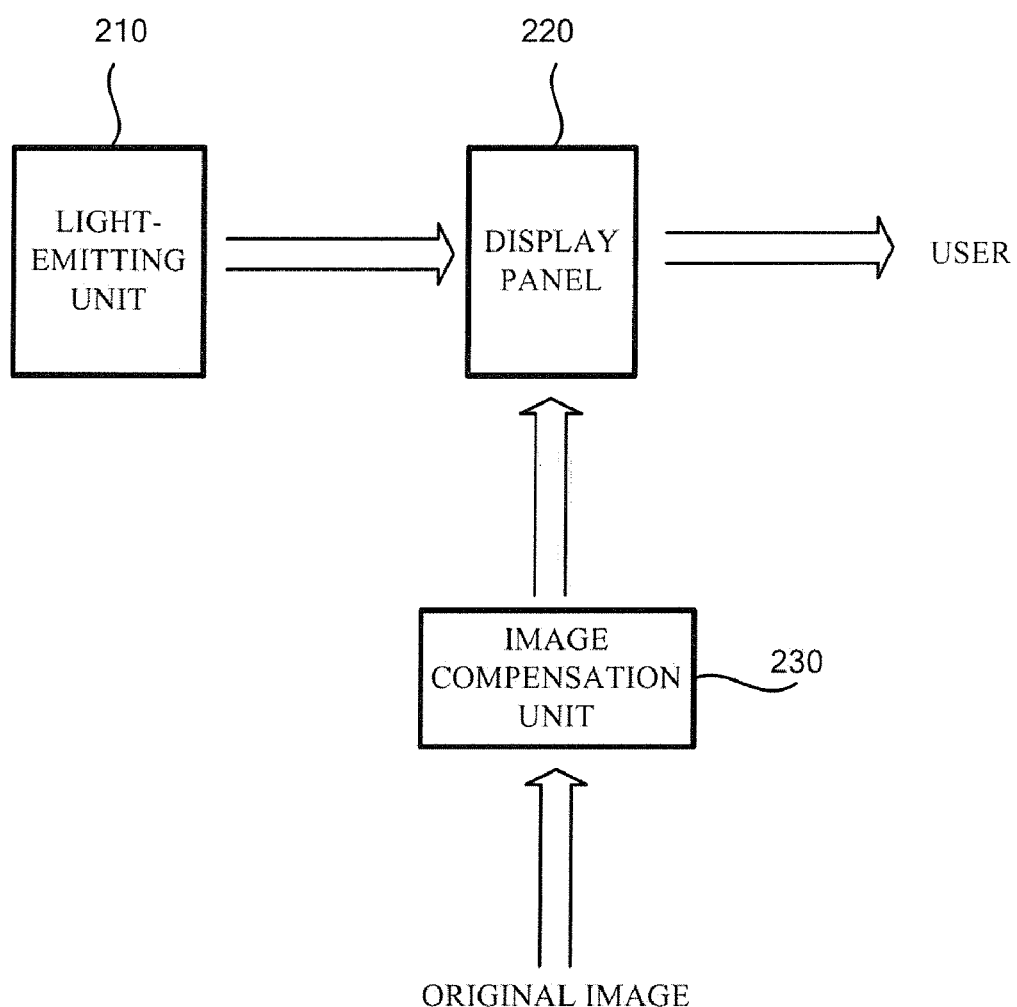

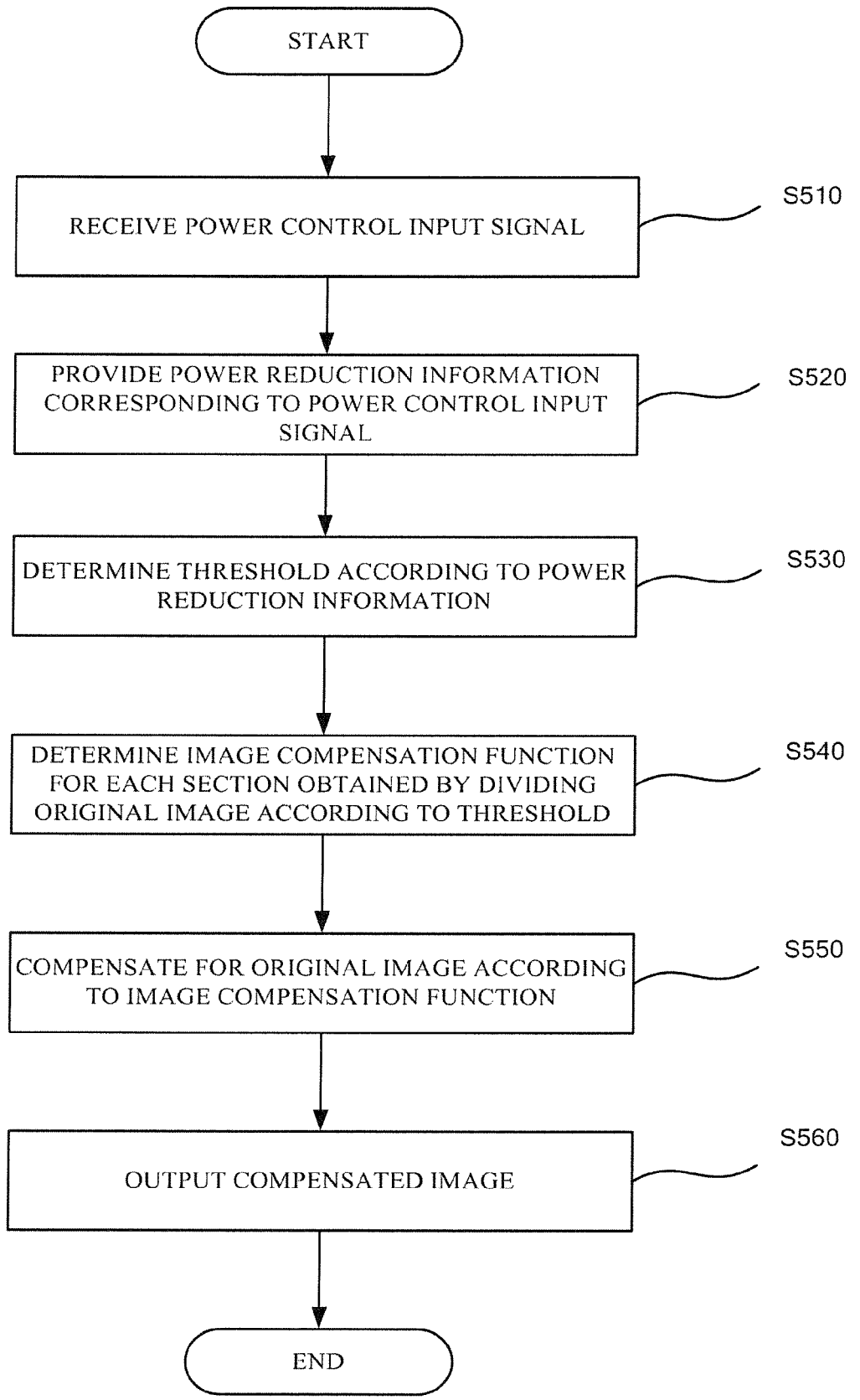

IMAGE COMPENSATION APPARATUS AND METHOD

CROSS-REFERENCE TO RELATED APPLICATION

This application claims the benefit of Korean Application No. 2006-62603 filed on Jul. 4, 2006 in the Korean Intellectual Property Office, the disclosure of which is incorporated herein by reference. Also, this application claims the benefit of Korean Application No. 2007-66164 filed on Jul. 2, 2007 in the Korean Intellectual Property Office.

BACKGROUND OF THE INVENTION

1. Field of the Invention

Aspects of the present invention relate to an image compensation apparatus and method, and more particularly, to an image compensation apparatus and method which can reduce the deterioration of the quality of images even when the supplied and/or the consumed power of a display device decreases.

2. Description of the Related Art

A display module is an essential part of a display device which actually displays images. The power consumption of the display module usually accounts for most of the power consumption of the entire display device.

Recently, display devices equipped with a display module that supports colors have been commercialized. In general, color display modules consume more power than black-and-white display modules.

Display modules may be largely classified as emissive type display modules and non-emissive type display modules. Emissive type display modules can self-generate light while non-emissive type display modules require an additional device that can generate light, such as a backlight unit.

Generally, a user may change the brightness of a display device when the display device is too bright or when the intensity of an external light source is too high for the display device. A display device that is too bright often causes eye fatigue, and an external light that is too intense decreases the visibility of images displayed by the display device.

The image properties that affect the visibility of the display device include brightness, luminance, grayscale, and chroma. However, when a user changes the brightness of the display device, the visibility of images is often ignored. Accordingly, the visibility of images displayed by the display device is reduced.

Similarly, when the brightness of a display device varies due to the display device's internal problems, the visibility of images displayed by the display device may also decrease. For example, when there is a shortage of battery power for a display device when a user views images displayed by the display device, the brightness of the images may decrease and result in a decrease in the visibility of the images.

Therefore, it is necessary to develop methods of maintaining the visibility of images even when the brightness of the images is decreased by the shortage of power supplied to the display device.

Korean Patent Publication No. 2004-54118 discloses a related art method of controlling power of a mobile communication terminal to reduce unnecessary power consumption and maximizing battery time. The method determines one or more high-picture quality items that need to be displayed with a high picture quality, determines whether the input data is a high-picture quality item, controls the brightness of the input data to have the same brightness level as that of a predefined high-picture quality backlight brightness level if the input data is a high-picture quality item, and controls the brightness of the input data to have the same brightness level as that of a predefined low-picture quality backlight brightness level if the input data is not a high-picture quality item. This method, however, does not suggest ways of compensating for the decreased quality of an image caused by the shortage of available power for a display device.

SUMMARY OF THE INVENTION

Aspects of the present invention include an image compensation apparatus and method which reduces the deterioration of the quality of an original image by compensating the values of a plurality of pixels of the original image to maintain the quality of the original image even when the supply or consumption of power of a display device decreases.

According to an aspect of the present invention, an image compensation apparatus includes a power control module which controls a light emitting unit according to a power control input signal input thereto by a user and provides power reduction information corresponding to the power control input signal, a control parameter generation module which determines a threshold based on the power reduction information, an image compensation module which divides input image information according to the threshold and converts the input image information according to image control information, and an output module which outputs image information obtained by the conversion performed by the image compensation module.

According to another aspect of the present invention, an image compensation method includes controlling a light emitting unit according to a power control input signal input thereto by a user and providing power reduction information corresponding to the power control input signal, determining a threshold based on the power reduction information, dividing input image information according to the threshold and converting the input image information according to image control information, and outputting image information obtained by the conversion performed on the input image information.

According to an aspect of the present invention, a method of compensating an image on a display includes: receiving a control signal to reduce power to the display; determining at least one threshold in pixel information of the image according to the received control signal to reduce power; determining at least one image compensating function that selectively adjusts the pixel information; compensating the image by applying the image compensating function to the pixel information; and outputting the compensated image to the display.

According to an aspect of the present invention, a method of adjusting an image on a display based on changing an amount of emitted light includes: changing an amount of power supplied to and/or consumed by the display to change the amount of emitted light; adjusting a portion of the pixel information of the image while maintaining a remaining portion of the pixel information of the image to improve both brightness and contrast of the image simultaneously.

According to an aspect of the present invention, an image compensation apparatus for use with a light emitting unit includes: a power control module to supply power to the light emitting unit; a control parameter generation module to generate one or more parameters to compensate pixel information of an image based on the supply of power by the power supply module; an image compensation module to compensate the image by dividing pixel information of the original image; and an output module to output the compensated image.

According to an aspect of the present invention, an image compensation apparatus to adjust brightness and contrast of a displayed image based on amount of emitted light dependent on a power usage includes: a power detector to detect the power usage; and a compensator to adjust pixel information of a portion of the image based on the detected power usage and to maintain pixel information of a remaining portion of the image.

According to an aspect of the present invention, a method of compensating an image on a display includes: dividing pixel information of the image into two or more sections based on power supplied to and/or consumed by the display; and adjusting the pixel information of one or more of the sections.

According to an aspect of the present invention, a method of compensating an image on a display includes: dividing pixel information of the image into two or more sections based on power supplied to and/or consumed by the display; and adjusting the pixel information of one or more of the sections differently from the pixel information of a remainder of the sections.

According to an aspect of the present invention, an image compensation apparatus for use with a display includes: pixel information of an image displayed on the display being divided into two or more sections based on power supplied to and/or consumed by the display; and the pixel information of one or more of the sections being adjusted differently from the pixel information of a remainder of the sections.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIG. 2 is a block diagram of an image compensation apparatus according to an aspect of the present invention;

FIG. 5 is a flowchart illustrating an image compensation method according to an aspect of the present invention.

DETAILED DESCRIPTION OF THE EMBODIMENTS

Figure 1A:
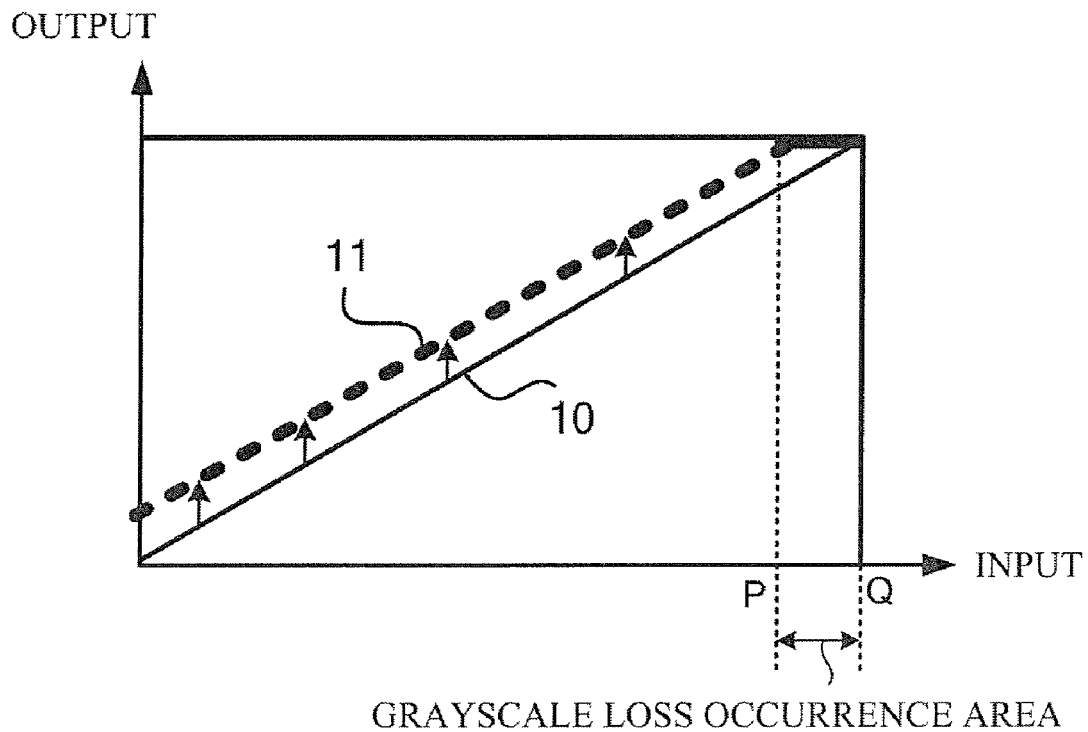
FIGS. 1A and 1B are diagrams for explaining related art image compensation methods.

Reference will now be made in detail to the aspects of the present invention, examples of which are illustrated in the accompanying drawings, wherein like reference numerals refer to the like elements throughout. The aspects are described below in order to explain the present invention by referring to the figures.

Aspects of the present invention are described hereinafter with reference to flowchart illustrations of user interfaces, methods, and computer program products according to aspects of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'display device' refers to a display device that displays an image, such as a flat panel display. The term 'image compensation apparatus' refers to a device that compensates an image. Flat panel displays may be classified as emissive type display devices, such as plasma display panels (PDPs) and organic light emitting diodes (OLEDs), and non-emissive type display devices, such as liquid crystal displays (LCDs) and digital light processing (DLP) (trademark) devices.

The term 'light emitting unit' refers to an emissive type display device or a backlight unit of a non-emissive type display device. An emissive type display device can be used as a light emitting unit because it can self-generate light and does not require the aid of an additional backlight unit.

Figure 1B:
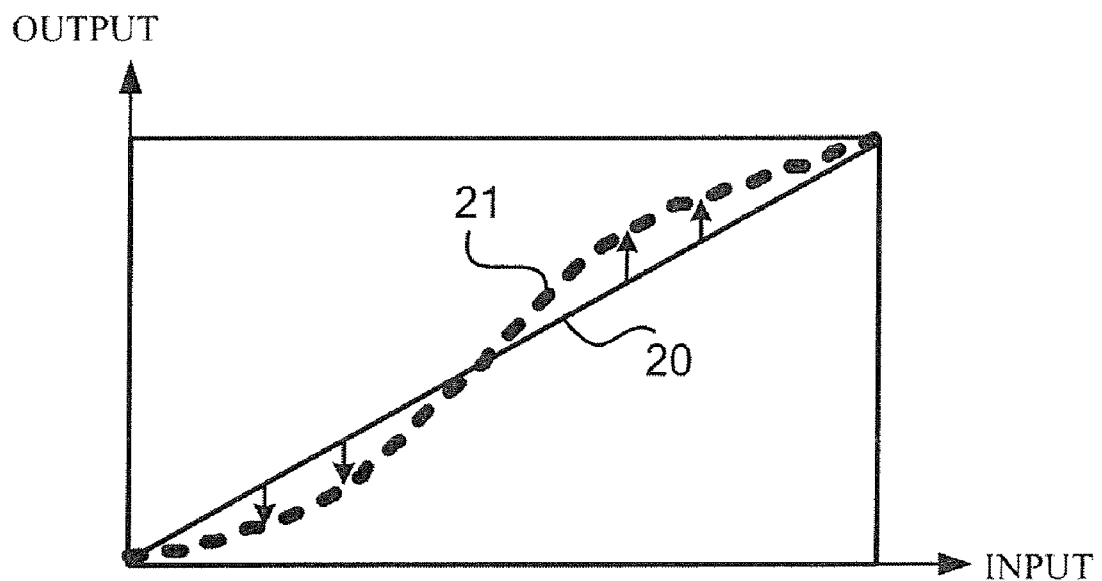

FIGS. 1A and 1B are diagrams for explaining related art image compensation methods. In FIGS. 1A and 1B, the x-axis represents the input pixel value and the y-axis represents the output pixel value.

Specifically, FIG. 1A explains a related art method of compensating a reduction in the amount of light emitted by a backlight unit which involves: determining a scaling value by calculating the degree to which the luminance of an original image can be increased; and linearly increasing each pixel value of the original image according to the scaling value.

As shown in FIG. 1A, a graph 10 (or line) represents pixel information (or a plurality of pixel values) of an original image that is converted into a graph 11 (or line) by linearly increasing the pixel information of the original image according to the determined scaling value. However, in this case, a linear coefficient (the scaling value) may considerably vary from one original image to another because of the different luminance of each original image. In addition, a reduction in the brightness of a display device may not properly compensate for the original image, especially for high-luminance images. In other words, referring to FIG. 1A, grayscale loss occurs in the range of a pixel value P and a pixel value Q because the grayscale value can not be increased further than a maximum value. Since the amount by which the brightness of a display device decreases may be inconsiderable (or small) for high-luminance images, high-luminance images are likely to be displayed as being relatively dark. Accordingly, if the scaling value method of FIG. 1A is used to compensate the original image, the quality of images deteriorates.

FIG. 1B explains another related art method of compensating a reduction in the amount of light emitted by a backlight unit which involves: increasing each of the high-luminance pixel values and reducing each of the low-luminance pixel values. A graph (or line) 20 represents pixel information of an original image that is converted into a graph (or curve) 21 to enhance the contrast of the original image. However, in this case, although the contrast of the image is enhanced because the darker areas in the original image are rendered to be even darker in the compensated image, the brightness of the original image is not enhanced by the compensation.

In other words, using the related art methods illustrated in FIGS. 1A and 1B, it is difficult to enhance both the brightness and the contrast of an original image at the same time. Accordingly, aspects of the present invention include an image compensation method that enhances both the brightness and the contrast of an image. The method changes and/or reduces the supplied and/or consumed power of a display device and compensates and/or adjusts the image accordingly. In various aspects, the grayscale values of the image may be divided and one set thereof my be treated differently from another. In other aspects, the compensation my be implemented by maintaining low-luminance grayscale values and increasing medium- and high-luminance grayscale values of the original image. Accordingly, a change and/or reduction in the brightness of a backlight unit can be properly compensated. The various aspects of the present invention will hereinafter be described in detail with reference to FIGS. 2 through 6. In particular, a diagram explaining a method to enhance both the brightness and the contrast properties of an original image at the same time will be illustrated in FIG. 4.

But first, FIG. 2 is a block diagram of an image compensation apparatus 200 according to an aspect of the present invention. Referring to FIG. 2, the image compensation apparatus 200 includes a light emitting unit 210, a display panel 220, and an image compensation unit 230. During operation of the image compensation apparatus 200, when the power consumption of the light emitting unit 210 decreases and the amount of light emitted by the light emitting unit 210 decreases, the image compensation unit 230 performs image compensation of an image displayed on the display panel 220.

In detail, in an initial or a non-compensated state of the image compensation apparatus 200, a signal value representing an original image bypasses the image compensation unit 230 to be directly input to the display panel 220. The amount of light emitted by the light emitting unit 210 is adjusted according to the input signal value and the result of the adjustment can be perceived by a user. On the other hand, if the amount of light emitted by the light emitting unit 210 is reduced (for example, according to a selection by the user) to conserve power, then the amount of light transmitted through the display panel 220 may decrease. Accordingly, the amount of light perceived by the user may also decrease and the visibility of the original image deteriorates.

Thus, when the amount of light emission is to be reduced, the image compensation unit 230 detects a power control signal that controls the supplied or consumed power of the light emitting unit 210. If the result of the detection indicates that the supplied or consumed power of the light emitting unit 210 has decreased, then the image compensation unit 230 may compensate the original image, and provide the compensated image to the display panel 220. When compensating, the image compensation unit 230 may compensate for the brightness and the contrast of the original image. Therefore, it is possible to maintain the same or similar visibility as that of the original image before the reduction in the supplied or consumed power of the light emitting unit 210 regardless of whether the amount of light emitted by the light emitting unit 210 has decreased.

The image compensation unit 230 may detect a reduction in the level of power supplied to and/or consumed by the light emitting unit 210 by detecting the output of, for example, an inverter (not shown) that controls the light emitting unit 210.

Figure 3:
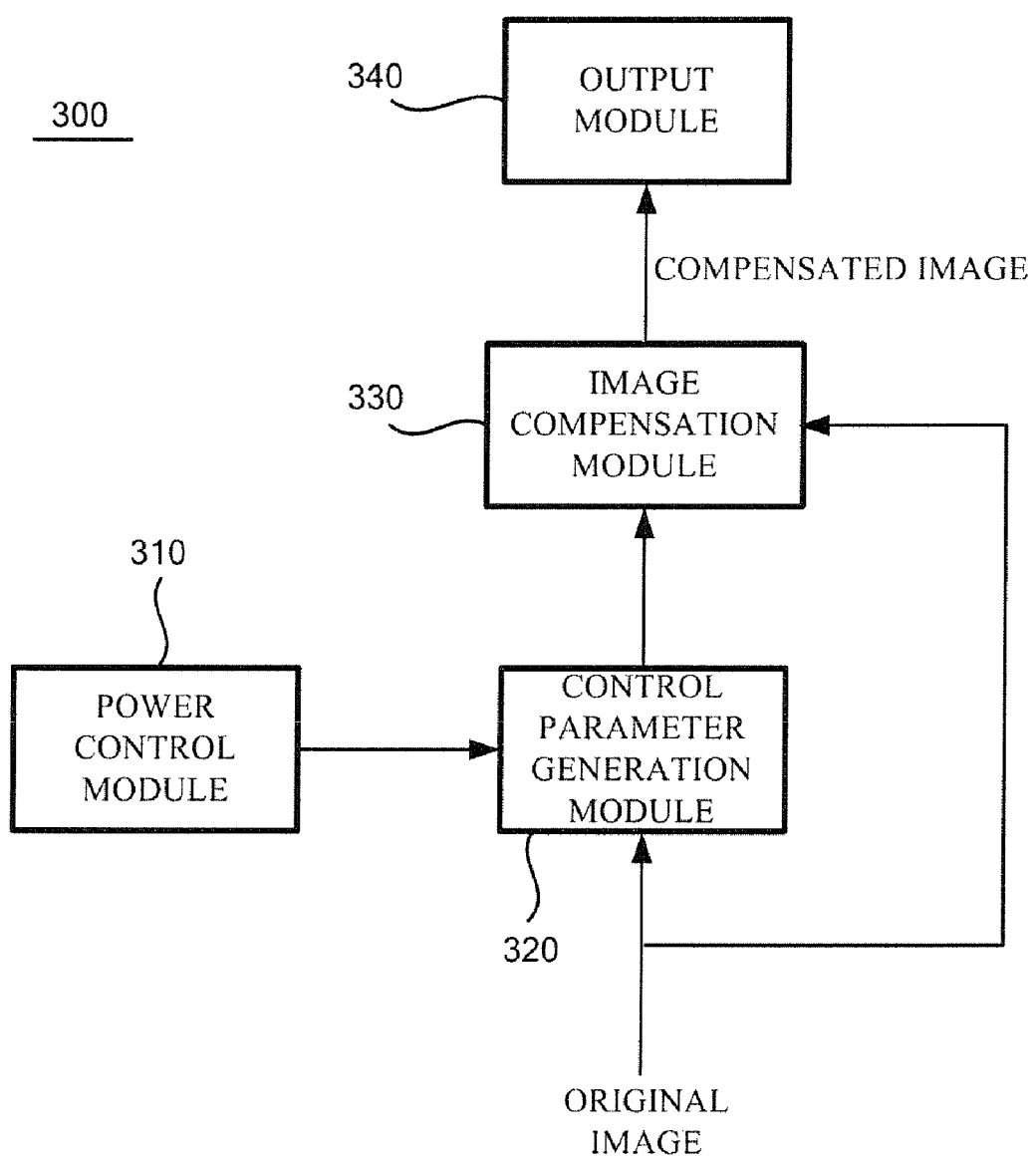
FIG. 3 is a block diagram of an image compensation apparatus according to another aspect of the present invention.

FIG. 3 is a block diagram of an image compensation apparatus 300 according to another aspect of the present invention. Referring to FIG. 3, the image compensation apparatus 300 includes a power control module 310, a control parameter generation module 320, an image compensation module 330, and an output module 340.

The term 'module', as used herein, refers to, but is not limited to, a software or hardware component, such as a Field Programmable Gate Array (FPGA) or Application Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Referring again to FIG. 3, the power control module 310 controls the power of a light emitting unit (not shown) such as a backlight unit according to a power control input signal, which may be selectively input thereto by a user, or according to a power control input signal generated based on external light detection. For example, a maximum power that can be supplied to and/or consumed by a display device may be assumed as 100. Also a first mode may be made to correspond to the situation when the display device consumes 70% of the maximum power of 100, a second mode may be made to correspond to the situation when the display device consumes 50% of the maximum power of 100, and a third mode may be made to correspond to the situation when the display device consumes 30% of the maximum power of 100. If the power control input signal is selectively input thereto by the user, the power control input signal that is input may indicate which of the first through third modes is chosen by the user. On the other hand, if the power control input signal is generated based on detection of external ambient light, the first through third modes may be chosen automatically. Accordingly, the power control module 310 controls the power of the light emitting unit (not shown) according to the power control input signal. Also, the power control module 310 provides the control parameter generation module 320 with power reduction information of the light emitting unit so that the control parameter generation module 320 can generate one or more control parameters usable for image compensation. In various aspects, the supply or consumption of power may vary smoothly from 0 to 100 of maximum power.

In detail, the control parameter generation module 320 generates one or more control parameters to compensate an original image based on pixel information of the original image and the power reduction information provided by the power control module 310.

The image compensation module 330 is provided with the one or more control parameters generated by the control parameter generation module 320, compensates for the pixel information of the original image, and outputs a compensated image to the output module 340. Accordingly, the output module 340 receives the compensated image provided by the image compensation module 330, and outputs the received compensated image.

Figure 4:
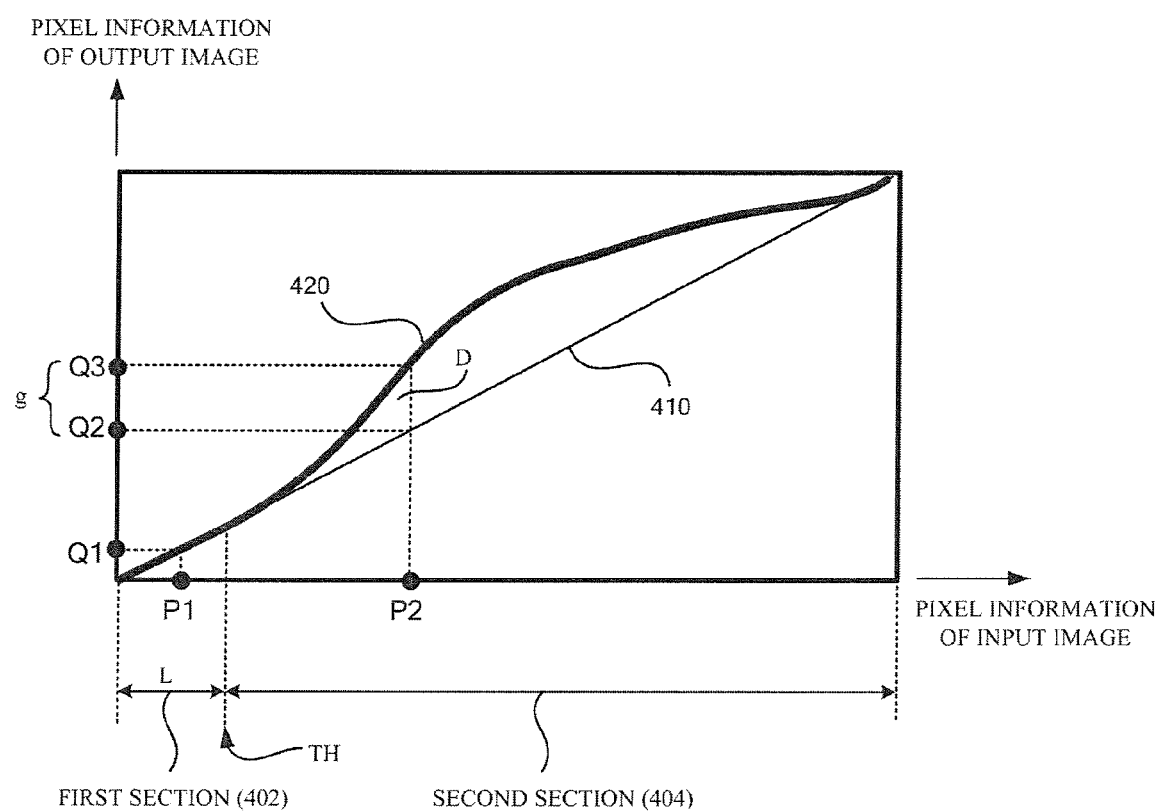
FIG. 4 is a diagram to explain the relationship between pixel information of an input image and pixel information of an output image obtained by compensating the input image.

The relationship between the pixel information of the original image (the input image) and the pixel information of a compensated image (output image) obtained by compensating the original image is illustrated in FIG. 4.

Referring to FIG. 4, the x-axis represents the input pixel information and the y-axis represents the output pixel information. The graph (or line) 410 indicates (or illustrates) the relationship between pixel information (a plurality of pixel values) of an original image and pixel information (a plurality of pixel values) of an output image when no image compensation is performed on the original image, and the graph (or curve) 420 indicates (or illustrates) the relationship between the pixel information (a plurality of pixel values) of the original image and pixel information (a plurality of pixel values) of an output image obtained by performing image compensation on the original image. In a non-limiting example, the pixel information of the original image is represented by eight bits so that the original image may have a total of 256 ($=2^8$) pixel values (in the range from 0 to 255). It is understood that other pixel values are within the scope of the invention.

The pixel information of the original image may be divided into two or more sections, i.e., the first section 402 and the second section 404. In the first section 402, the pixel information of the original image is converted into pixel information of an output image according to the graph 410. Accordingly, no image compensation may be performed on the pixel information of the original image in the first section 402. On the other hand, the original image is compensated in the second section 404 by changing the pixel information of the original image. In this case, the pixel information of the original image is changed by increasing the pixel information by a predetermined and/or a varying amount.

According to aspects of the present invention shown in FIG. 4, the value of a pixel (or a value in between two adjacent pixels) at the boundary between the first section 402 and the second section 404 is referred to as a threshold (TH), and the amount by which the pixel information of the original image is increased is referred to as a compensation amount (g). The control parameters generated by the control parameter generation module 320 may include the threshold TH and the compensation amount g.

In a non-limiting aspect, the threshold TH may be determined according to the power reduction information provided by the power control module 310. For example, the control parameter generation module 320 may include a lookup table which indicates the relationship between a reduction in the power of a light emitting unit and the threshold TH, and determine the threshold TH according to the power reduction information provided by the power control module 310 by referencing the lookup table. In another non-limiting aspect, the threshold TH may be calculated based on the received power reduction information and/or other information and be selectively generated as desired, without referring to the lookup table.

In various aspects, the compensation represented by the graph 420 illustrated in FIG. 4 can be generated or adjusted by the control parameter generation module 320. In detail, the pixel value P1 of the original image belongs to the first section 402. Accordingly, the pixel value P1 is converted into a pixel value Q1 without the need to be compensated. On the other hand, an input pixel value P2 of the original image belongs to the second section 404. Accordingly, the input pixel value P2 is converted into a pixel value Q3 in accordance with graph 420, instead of being converted into the input pixel value Q2, in accordance with the graph 410. In other words, the pixel information of the original image is increased by |Q2−Q3| for the input pixel value P2.

There are several ways the graph 420 may be obtained and used to illustrate the compensation. In one non-limiting aspect shown in FIG. 4, a length (L) of a first section 402 and a difference (D) between output pixel values Q3 and Q2 corresponding to the input pixel value P2 that belongs to the second section 404 (i.e., |Q3−Q2|) may be changed. Specifically, the length L of the threshold TH and the difference D may increase proportionally according to a reduction in the brightness of a backlight unit. In another non-limiting aspect, the length (L) of the first section 402 and the value |Q3−Q2| may be adjusted according to the pattern of distribution of pixel values of an input image.

For example, the adjustment of the length of the first section 402 and |Q3−Q2| according to the pattern of distribution of pixel values of an input image is performed as follows. If most of the pixel values of the input image are determined to correspond to low luminance values, then the length of the first section 402 and |Q3−Q2| may be set low. By doing so, it is possible to compensate a reduction in low-luminance grayscale rendering capability caused by a reduction in the brightness of a backlight unit and to provide a clearly visible image on a screen.

Referring again to FIG. 4, the pixel information of the original image may be compensated by using the luminance of the original image. In other words, if the luminance of the original image is lower than a predefined threshold (or level), the pixel information of the original image may not be compensated or adjusted. On the other hand, if the luminance of the original image is higher than the predefined threshold (or level), the pixel information of the original image may be compensated by increasing the luminance of the original image by a predetermined compensation amount. Finally, if the luminance of the original image is higher than another predefined threshold (or level), the pixel information of the original image may not be compensated, as may be the case with the very high pixel information.

As discussed above, and referring yet again to FIG. 4, although the pixel information of the original image in the first section 402 is described as being converted into pixel information of an output image without being compensated, aspects of the present invention is not restricted to this. In other words, the pixel information in the first section 402, like the pixel information in the second section 404, may also be changed. Accordingly, the first section 402 may be treated differently from the second section In various aspects, the pixel information may be changed and/or increased by a predetermined and/or varying compensation amount.

The operation of the image compensation apparatus 300 illustrated in FIG. 3 will hereinafter be described in reference to FIG. 5. FIG. 5 is a flowchart illustrating an image compensation method according to an aspect of the present invention. Referring to FIG. 5, in operation S510, the power control module 310 receives a power control input signal, for example, from a user. In operation S520, the power control module 310 provides the control parameter generation module 320 with power reduction information corresponding to the received power control input signal. In operation S530, the control parameter generation module 320 determines the threshold TH based on the received power reduction information.

In operation S540, the image compensation module 330 determines an image compensation function for each of a plurality of sections obtained by dividing pixel information of an original image according to the threshold TH. In operation S550, the image compensation module 330 compensates the original image using the image compensation function. Then, in operation S560, the output module 340 provides the user with a compensated image provided by the image compensation module 330. Accordingly, the user can reduce the supplied or consumed power of the light emitting unit while maintaining the visibility of the original image through image compensation.

Referring back to FIG. 5, in operation S540, the image compensation function may be determined according to one or more control parameters generated by the control parameter generation module 320. The generated control parameters include the threshold TH and the compensation amount g.

In addition to the threshold TH and/or the compensation amount g, the control parameters may also include a set of coefficients that correspond to predetermined or desired image properties. In various aspects, the control parameters correspond to a set of values that are used to determine the coefficients. The image compensation function may be interpreted as being image control information that is used for image compensation.

In various aspects, the threshold TH and/or the compensation amount g may be altered proportionally according to a reduction in the brightness of a light emitting unit, and/or may be adjusted according to the pattern of distribution of pixel values of an original image. For example, if most of the pixel values of the original image are determined to correspond to low luminance values, then the threshold TH and the compensation amount g may both be set low. The length (L) may be short and the difference D may be small. By doing so, it is possible to properly compensate for a reduction in low-luminance grayscale rendering capability caused by a reduction in the brightness of the light emitting unit. In various aspects, the original image is relatively not bright to start with, more of the pixel values are subject to compensation but the compensation amount of each pixel value may be relatively small. On the other hand, if the original image is relatively bright to start with, less of the pixel values are subject to compensation but the compensation amount of each pixel value may be relatively large. Accordingly, a clearly visible image may be provided on a screen of a display device.

There are various ways to determine the threshold TH. In a non-limiting example, the control parameter generation module 320 may determine the threshold TH with reference to a lookup table which indicates the relationship between the power reduction information provided by the power control module 310 and the threshold TH. For example, when the screen brightness of the image compensation apparatus 300 is considerably reduced due to a reduction in the supplied or consumed power of the light emitting unit, the control parameter generation module 320 may set the threshold TH low. For this, a lookup table indicating the correspondences between default values for the threshold TH and screen brightness reduction amounts may be stored in the control parameter generation module 320 or an additional memory of the image compensation apparatus 300. On the other hand, the compensation amount g may be determined according to pixel information of the original image. The compensation amount g may be determined with reference to a lookup table which indicates the correspondences between pixel values and default values for the compensation amount g. Accordingly, the threshold TH and the compensation amount g need not be increased or reduced together, but may be independently controlled.

In another non-limiting example, the threshold TH and/or the compensation amount g may be determined according to a function that uses a change (such as a reduction) in the screen brightness of the image compensation apparatus 300 and/or the pixel information of the original image as parameters. Also, in various aspects, the threshold TH and the compensation amount g may be experimentally determined in advance.

As previously noted, in a non-limiting example, if a pixel value x of the original image is the same as or less than the threshold TH, then the pixel value x of the original image may not be compensated. On the other hand, if the pixel value of the original image exceeds the threshold TH, then the pixel value x of the original image may be compensated.

If compensated, and if expressed as a function, the compensation of the pixel information of the original image may be represented by Equation (1):

$$\text{if } x > TH,\ y1 = F(x)*g$$

$$\text{else},\ y2 = x \qquad (1)$$

where y1 indicates pixel information of a compensated image and $F(x)$ indicates a function that compensates the input pixel information x and has the graph property indicated by the graph 420 illustrated in FIG. 4, g indicates the compensation amount, and y2 indicates the non-compensated pixel information. The function $F(x)$ can be determined by using the pixel information of the original image as a parameter.

In various non-limiting aspects, the function $F(x)$ can be represented as a polynomial, as represented by Equation (2):

$$F(x) = ax^5 + bx^4 + cx^3 + dx^2 + ex^1 + f \qquad (2)$$

where a, b, c, d, e, and f are coefficients. The coefficients a, b, c, d, e, and f can be determined experimentally or determined according to the pixel information of the original image. A set of the coefficients a, b, c, d, e, and f may be generated by the control parameter generation module 320, and then, the resulting coefficient set may be provided to the image compensation module 330.

Referring to Equations (1) and (2), the intersection between y1 and y2, i.e., the value of x that satisfies the following equation: $x = (ax^5 + bx^4 + cx^3 + dx^2 + ex^1 + f)*g$, corresponds to the threshold TH. Thus, the values of the coefficients a, b, c, d, e, and f and the compensation amount g may be determined so as to satisfy the following equation: $x = (ax^5 + bx^4 + cx^3 + dx^2 + ex^1 + f)*g$.

In other words, when compensating for the original image according to the graph 420 illustrated in FIG. 4, the pixel information of the original image is increased by the compensation amount g. Thus, even when the screen brightness of the image compensation apparatus 300 decreases, the user can be provided with an image whose brightness is almost indistinguishable from that of the original image in the best case. Also, since pixel information of the original image less than the threshold TH is not compensated, a contrast can be maintained, to maintain the visibility of the original image. This will be described later in further detail with reference to FIGS. 6A and 6B.

Accordingly, if the pixel value x indicates the luminance of the original image, F(x)*g may indicate a compensated luminance value in a non-limiting example. Consequently, the output module 340 may output an image whose luminance is compensated by the image compensation module 330.

Figure 6A:
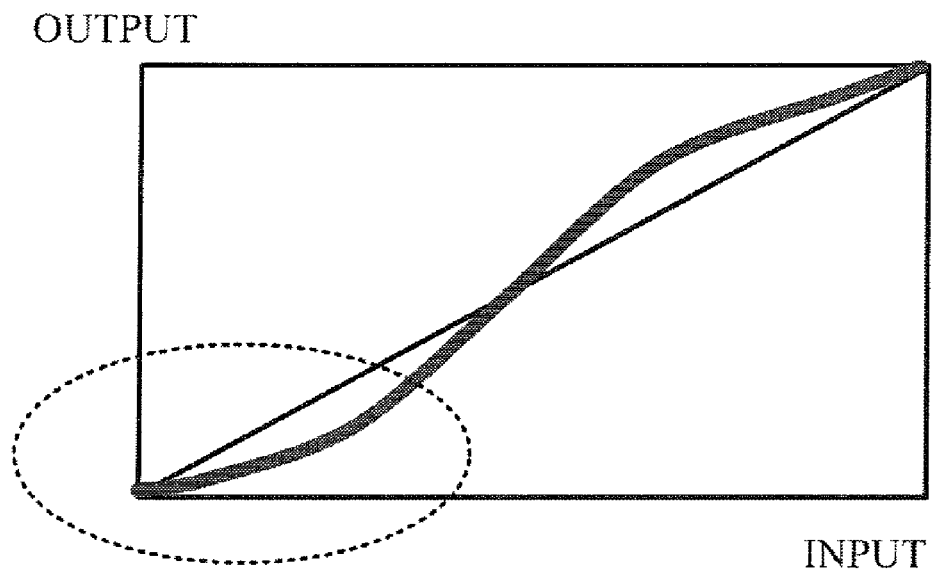
FIG. 6A is a diagram of low-grayscale image properties of a related art compensation method and FIG. 6B is a diagram of low-grayscale image properties of a compensation method according to an aspect of the present invention.

FIG. 6A is a graph of low-grayscale image properties of a related art, and 6B is a graph of low-grayscale image properties according to an aspect of the present invention. Both FIGS. 6A and 6B highlights the low grayscale ends thereof.

When the supplied or consumed power of a light emitting unit decreases, the luminance of a display screen decreases. Accordingly, in the related art, grayscale differentiation may considerably deteriorate, as indicated by a dotted outline illustrated in FIG. 6A due to a decrease in the low grayscale pixel information.

Figure 6B:
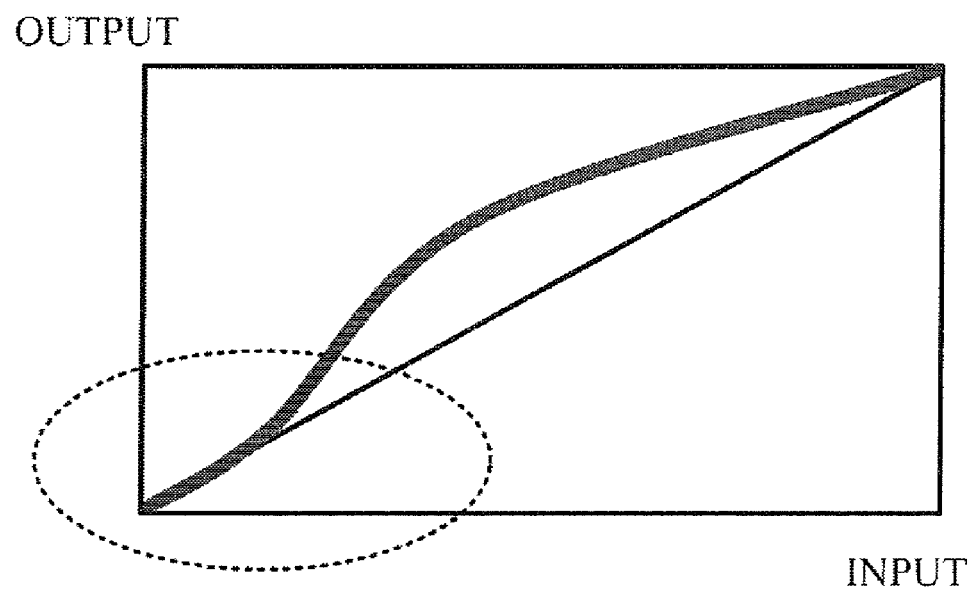

On the other hand, in the aspects of the present invention, the deterioration of the quality of an original image is reduced even when the luminance of a display screen decreases as shown in FIG. 6B by improving the brightness and contrast of the original image, especially for medium- and high-grayscale areas in the original image, while maintaining grayscale differentiation, especially for low-grayscale areas in the original image.

In various aspects, the display device may be a mobile device, such as a portable computer, cell phones, PDAs, portable audio players, and the like.

In various aspects, an increase in the supplied or consumed power and a resulting compensation of an original image is also within the scope of the invention.

As described above, according to aspects of the present invention, it is possible to change and/or reduce the power consumption of a display device by compensating for pixel information of an original image so that deterioration of the quality of the original image can be reduced due to a change and/or reduction in the luminance of the display device.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. An image compensation apparatus comprising:
    a power control module which controls a light emitting unit according to a power control input signal input thereto by a user and provides power reduction information corresponding to the power control input signal;
    a control parameter generation module which determines a threshold based on the power reduction information;
    an image compensation module which divides input image information according to the threshold and converts the input image information according to image control information; and
    an output module which outputs image information obtained by the conversion performed by the image compensation module,
    wherein the image compensation module divides an original image into a first image information section and a second image information section according to the threshold, maintains image information belonging to the first image information section, and converts image information belonging to the second image information section according to the image control information.

2. The image compensation apparatus of claim 1, wherein the image control information increases the input image information by a predetermined amount.

3. The image compensation apparatus of claim 1, wherein the image compensation module does not convert the input image information less than the threshold.

4. The image compensation apparatus of claim 1, wherein the image compensation module converts the input image information by increasing the input image information less than the threshold by a predetermined amount.

5. The image compensation apparatus of claim 1, wherein the image control information increases the input image information by a predetermined amount.

6. An image compensation method comprising:
    controlling a light emitting unit according to a power control input signal input thereto by a user and providing power reduction information corresponding to the power control input signal;
    determining a threshold based on the power reduction information;
    dividing input image information according to the threshold and converting the input image information according to image control information; and
    outputting image information obtained by the conversion performed in on the input image information,
    wherein the dividing of the input image information comprises
        dividing an original image into a first image information section and a second image information section according to the threshold;
        maintaining image information belonging to the first image information section; and
        converting image information belonging to the second image information section according to the image control information.

7. The image compensation method of claim 6, wherein the image control information increases the input image information by a predetermined amount.

8. The image compensation method of claim 6, wherein the dividing of the input image information comprises not compensating for the input image information less than the threshold.

9. The image compensation method of claim 6, wherein the dividing of the input image information comprises converting the input image information by increasing the input image information less than the threshold by a predetermined amount.

10. The image compensation method of claim 6, wherein the image control information increases the input image information by a predetermined amount.

* * * * *